United States Patent
Arnold

(10) Patent No.: US 8,075,040 B2
(45) Date of Patent: Dec. 13, 2011

(54) VEHICLE HAVING UTILITY BED AND SEAT

(75) Inventor: David W. Arnold, Glendale, CA (US)

(73) Assignee: Honda Motor Company, Ltd., Tokyo (JP)

( * ) Notice: Subject to any disclaimer, the term of this patent is extended or adjusted under 35 U.S.C. 154(b) by 184 days.

(21) Appl. No.: 12/477,717

(22) Filed: Jun. 3, 2009

(65) Prior Publication Data

US 2010/0308614 A1    Dec. 9, 2010

(51) Int. Cl.
B60N 2/32 (2006.01)
B60N 2/36 (2006.01)

(52) U.S. Cl. ........... 296/69; 296/66; 296/63; 296/183.2; 297/378.12

(58) Field of Classification Search ............ 296/64, 296/66, 65.01, 69, 184.1, 26.01, 182.1, 183.1, 296/183.2; 297/15, 378.12
See application file for complete search history.

(56) References Cited

U.S. PATENT DOCUMENTS

| | | | |
|---|---|---|---|
| 4,480,868 A * | 11/1984 | Koto | ............ 296/190.11 |
| 5,934,727 A | 8/1999 | Store et al. | |
| 5,979,964 A | 11/1999 | Ban et al. | |
| 6,237,981 B1 | 5/2001 | Selleck | |
| 6,416,104 B1 | 7/2002 | Fisher et al. | |
| 6,481,772 B1 | 11/2002 | Tenn | |
| 6,557,882 B2 | 5/2003 | Harrington | |
| 6,644,709 B2 | 11/2003 | Inagaki et al. | |
| D498,435 S | 11/2004 | Saito et al. | |
| 6,994,388 B2 | 2/2006 | Saito et al. | |
| 7,416,238 B2 | 8/2008 | Houston | |
| 7,735,896 B2 * | 6/2010 | Kubota | .................. 296/69 |
| 2005/0264048 A1 | 12/2005 | Collins | |
| 2008/0309112 A1 | 12/2008 | Duller | |
| 2009/0256388 A1 * | 10/2009 | Tanaka et al. | ............ 296/186.4 |

* cited by examiner

Primary Examiner — Glenn Dayoan
Assistant Examiner — Melissa A Black
(74) Attorney, Agent, or Firm — Ulmer & Berne LLP

(57) ABSTRACT

A vehicle includes a vehicular frame, a utility bed, a seat back, and a seat bottom. The utility bed is coupled with the vehicular frame. The utility bed comprises a bed frame, a bed floor, and an end wall. The bed floor comprises first and second floor portions. The first floor portion is pivotable between an upright position and a cargo support position. The second floor portion is coupled with the frame. The end wall is movably coupled with the bed frame and is moveable between an erected position and a collapsed position. The seat back is coupled with first floor portion. The seat bottom is coupled with the end wall. When the first floor portion is in the upright position with the end wall in the collapsed position, the seat back and the seat bottom cooperate to provide a seat.

16 Claims, 6 Drawing Sheets

VEHICLE HAVING UTILITY BED AND SEAT

TECHNICAL FIELD

A vehicle includes a frame and a utility bed. The utility bed is coupled with the frame. The utility bed includes an end wall and a floor portion which are each movable to provide a seat.

BACKGROUND

Certain conventional vehicles include a utility bed which is movable between a hauling position and a dumping position. Such a utility bed is often referred to as a "dump bed" and is suitable to selectively facilitate transportation of cargo.

SUMMARY

In accordance with one embodiment, a vehicle comprises a vehicular frame, a utility bed, a seat back, and a seat bottom. The utility bed is pivotally coupled with the vehicular frame and is pivotable between a hauling position and a dumping position. The utility bed comprises a bed frame, a bed floor and an end wall. The bed floor comprises a first floor portion that is pivotable with respect to the bed frame between an upright position and a cargo support position. The end wall is movably coupled with the bed frame and is moveable between an erected position and a collapsed position. The seat back is coupled with the first floor portion. The seat bottom is coupled with the end wall. When the first floor portion is in the upright position with the end wall in the collapsed position, the seat back and the seat bottom cooperate to provide a seat.

In accordance with yet another embodiment, a vehicle comprises a vehicular frame, a utility bed, a seat back, and a seat bottom. The utility bed is coupled with the vehicular frame and comprises a bed frame, a bed floor, an end wall, a left side wall, and a right side wall. The bed floor comprises a first floor portion. The first floor portion is pivotable between an upright position and a cargo support position. The end wall is movably coupled with the bed frame and is moveable between an erected position and a collapsed position. The left side wall comprises a left door that is pivotable between an opened position and a closed position. The right side wall comprises a right door that is pivotable between an opened position and a closed position. The seat back is coupled with the first floor portion. The seat bottom is coupled with the end wall. When the first floor portion is in the upright position with the end wall in the collapsed position, the seat back and seat bottom cooperate to provide a seat.

In accordance with still another embodiment, a vehicle comprises a vehicular frame, a utility bed, a left seat back, a right seat back, a left seat bottom, and a right seat bottom. The utility bed is pivotally coupled with the vehicular frame and is pivotable between a hauling position and a dumping position. The utility bed comprises a bed frame, a bed floor, a front wall, a left side wall, and a right side wall. The bed floor comprises a rear floor and a front floor. The rear floor is coupled with the bed frame. The front floor is pivotally coupled with the rear floor and is pivotable between an upright position and a cargo support position. The front wall is pivotally coupled with the bed frame and is pivotable between an erected position and a collapsed position. The left side wall comprises a left door that is pivotable between an opened position and a closed position. The right side wall comprises a right door that is pivotable between an opened position and a closed position. The left seat back is coupled with the front floor. The right seat back is coupled with the front floor. The left seat bottom is coupled with the front wall. The right seat bottom is coupled with the front wall. When the front floor is in the upright position with the front wall in the collapsed position, the left seat back and the left seat bottom cooperate to provide a left seat, and the right seat back and the right seat bottom cooperate to provide a right seat.

BRIEF DESCRIPTION OF THE DRAWINGS

Various embodiments will become better understood with regard to the following description, appended claims and accompanying drawings wherein:

DETAILED DESCRIPTION

Figure 1:
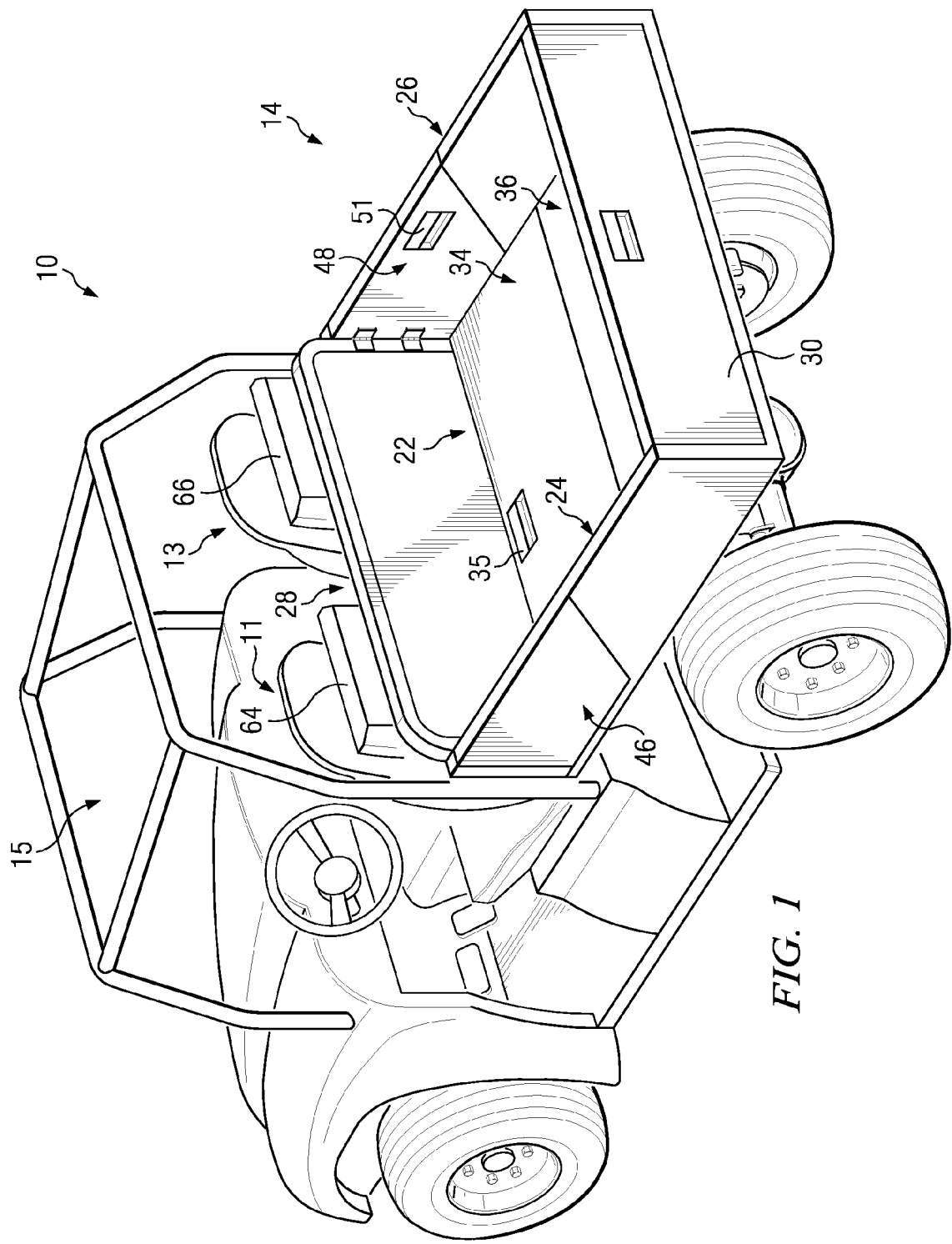
FIG. 1 is a left rear perspective view depicting a vehicle in accordance with one embodiment.

Embodiments are hereinafter described in detail in connection with the views of FIGS. 1-6, wherein like numbers indicate the same or corresponding elements throughout the views. A vehicle includes a utility bed which can be used to facilitate hauling of cargo by the vehicle. In one embodiment, the vehicle can be a dump-type vehicle having a utility bed that can facilitate selective dumping of cargo from the utility bed. A dump-type vehicle can comprise a light utility vehicle, such as the utility vehicle 10 shown in FIGS. 1-6. In other embodiments, a dump-type vehicle can comprise any of a variety of other types of vehicles having a utility bed capable of dumping (e.g., a dump bed) such as, for example, a pickup truck, a dump truck, an all terrain vehicle ("ATV"), and a golf cart, for example. In another embodiment, the vehicle can include a non-dump type vehicle having a utility bed that is rigidly fixed to the vehicle's frame (e.g., a non-dumpable bed). In yet another embodiment, the vehicle can include a trailer.

Referring again to FIGS. 1-6, the utility vehicle 10 can include a vehicular frame 12. The vehicular frame 12 can include any of a variety of structural and/or decorative rails, panels, and/or other components which are typically, although not necessarily, formed from metal (e.g., steel and/or aluminum). A front left seat 11 and a front right seat 13 can each be supported by the vehicular frame 12 and can facilitate support of occupants within the vehicle's passenger compartment 15. The utility vehicle 10 can also include a utility bed 14 which is coupled with the vehicular frame 12, either directly or indirectly, and such as through use of a hinge assembly 16 shown in FIG. 2. The hinge assembly 16 can facilitate pivotable movement of the utility bed 14 with respect to the vehicular frame 12 of the utility vehicle 10, and between a hauling position (shown in FIGS. 1 and 3-6) and a dumping position (shown in FIG. 2). When the utility bed 14 is in the hauling position, a front rest portion 18 of the utility bed 14 can rest upon a rest surface 19 provided by a rest structure 20 which is attached to the vehicular frame 12 of the utility vehicle 10. In one embodiment, the rest structure 20 can comprise a rigid structure (e.g., formed from sheet metal), though in another embodiment, a rest structure can comprise a resilient element (e.g., a rubber bumper). It will be appreciated that any of a variety of known conventional mechanisms or methods (none shown) can be provided to facilitate manual or powered movement of the utility bed 14 between the hauling and dumping positions under control of an operator of the utility vehicle 10.

In the embodiment of FIGS. 1-6, the utility bed 14 is shown to comprise a bed floor 22. The utility bed 14 is also shown to include a left side wall 24 and a right side wall 26 extending generally perpendicularly from the bed floor 22 or locations adjacent to the bed floor 22. The utility bed 14 can also shown to include end walls such as a front wall 28 and a tailgate 30 as illustrated in FIGS. 1-6. The tailgate 30 can be pivotally coupled with respect to the bed floor 22. When the utility bed 14 is in the hauling position (shown in FIGS. 1 and 3), it will be appreciated that the left side wall 24, the right side wall 26, and the front wall 28 can cooperate with the bed floor 22 to retain cargo within the utility bed 14. The tailgate 30, when closed (as shown in FIGS. 1-6), can also cooperate with the left side wall 24, the right side wall 26, and the bed floor 22 to retain cargo within the utility bed 14. It will be appreciated that the tailgate 30 can be selectively opened to facilitate loading of the utility bed 14 and/or to allow cargo (e.g., dirt) to pour from the utility bed 14 when the utility bed 14 is in a dumping position (shown in FIG. 2). In another embodiment, it will be appreciated that a rear wall can be provided in lieu of a tailgate with the rear wall being rigidly affixed with respect to a bed floor of a utility bed such that it might not be capable of being selectively opened by an operator. In yet another alternative embodiment, it will be appreciated that one or more side walls (e.g., 24 and/or 26) of a utility bed might be capable of being selectively opened (e.g., like tailgate 30) by an operator. In still another alternative embodiment, it will be appreciated that a utility bed might not include any tailgate and/or side walls and might, for example, comprise a flat-bed type configuration (e.g., commonly used for hauling small vehicles).

Figure 4:
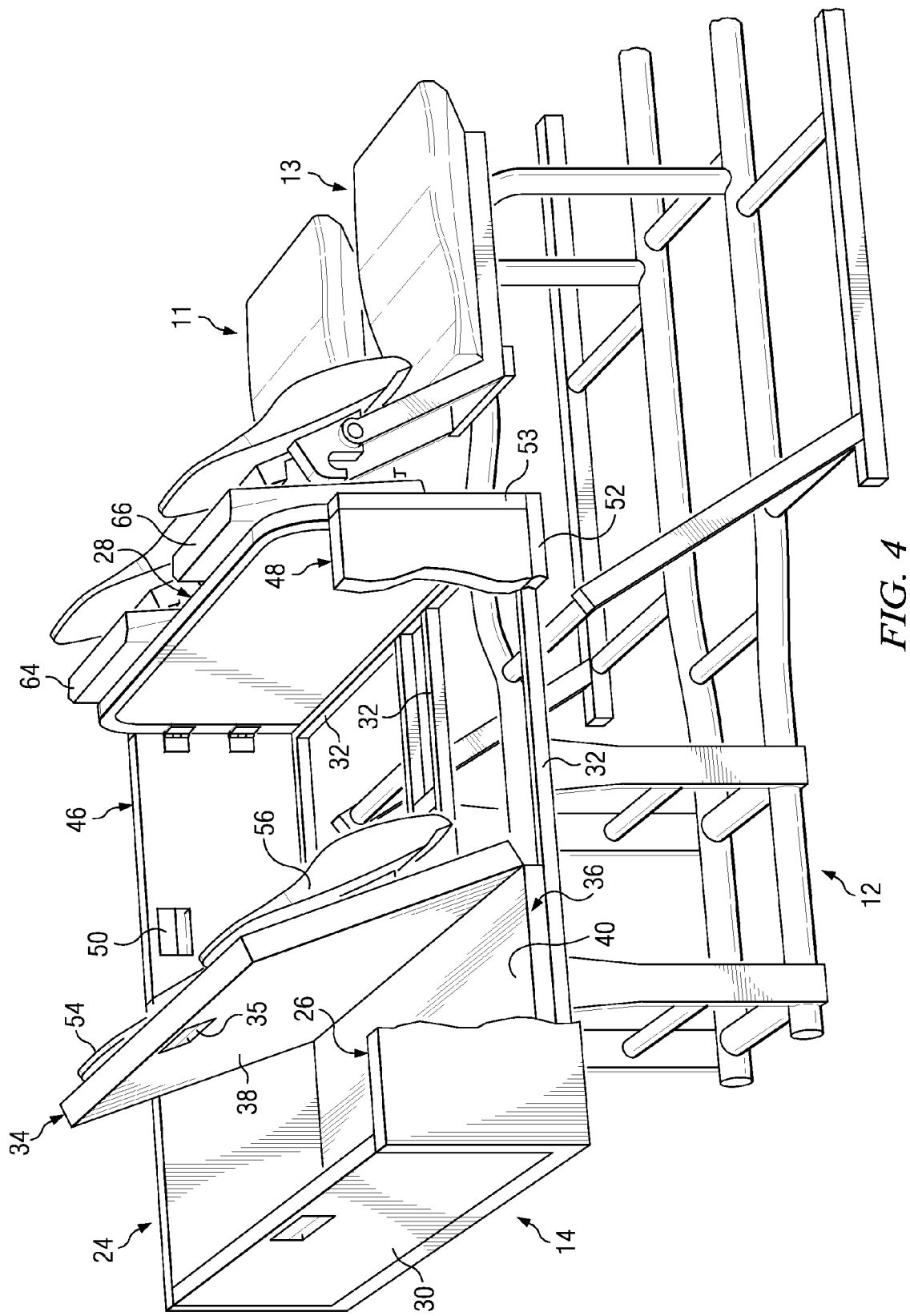
FIG. 4 is a right rear perspective view similar to FIG. 3 but with the front floor of the utility bed in an upright position.
Figure 5:
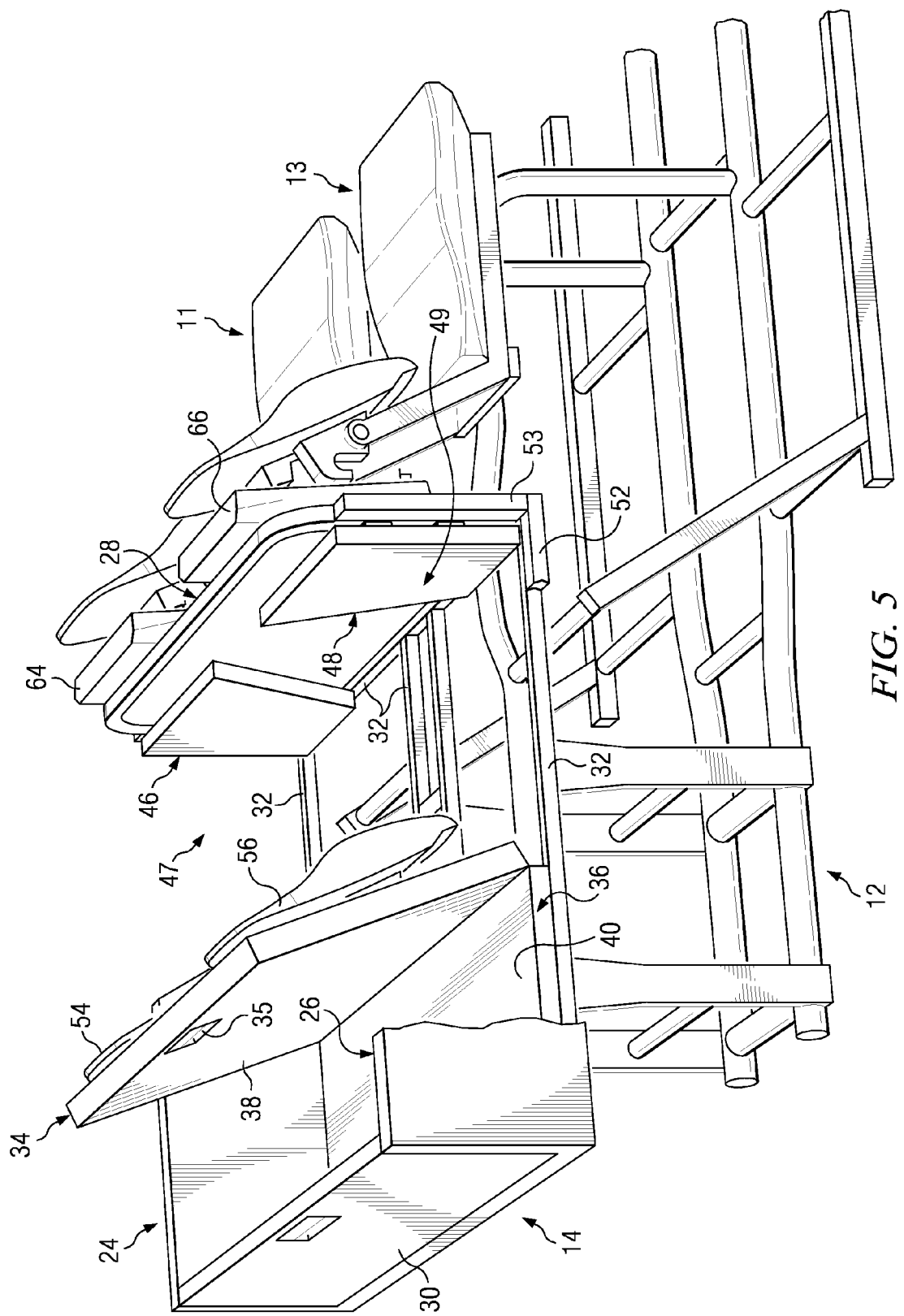
FIG. 5 is a right rear perspective view similar to FIG. 4 but with the in the hauling position with a left and right doors in opened positions.

In one embodiment, the utility bed 14 can include a bed frame 32 configured to provide underlying and structural support for certain components of the utility bed 14. As illustrated in FIG. 4, the bed frame 32 can comprise a tubular frame structure that extends along a perimeter of the bed floor 22 (and additionally underneath the bed floor 22, as illustrated in FIGS. 4 and 5) and provides underlying support for the bed floor 22, the left and right side walls 24, 26, and/or the front wall 28. It will be appreciated however that a bed frame can be provided in any of a variety of suitable alternative arrangements. For example, a bed frame might be integrally formed as part of a bed floor such as in a one-piece bed floor/bed frame configuration.

Figure 3:
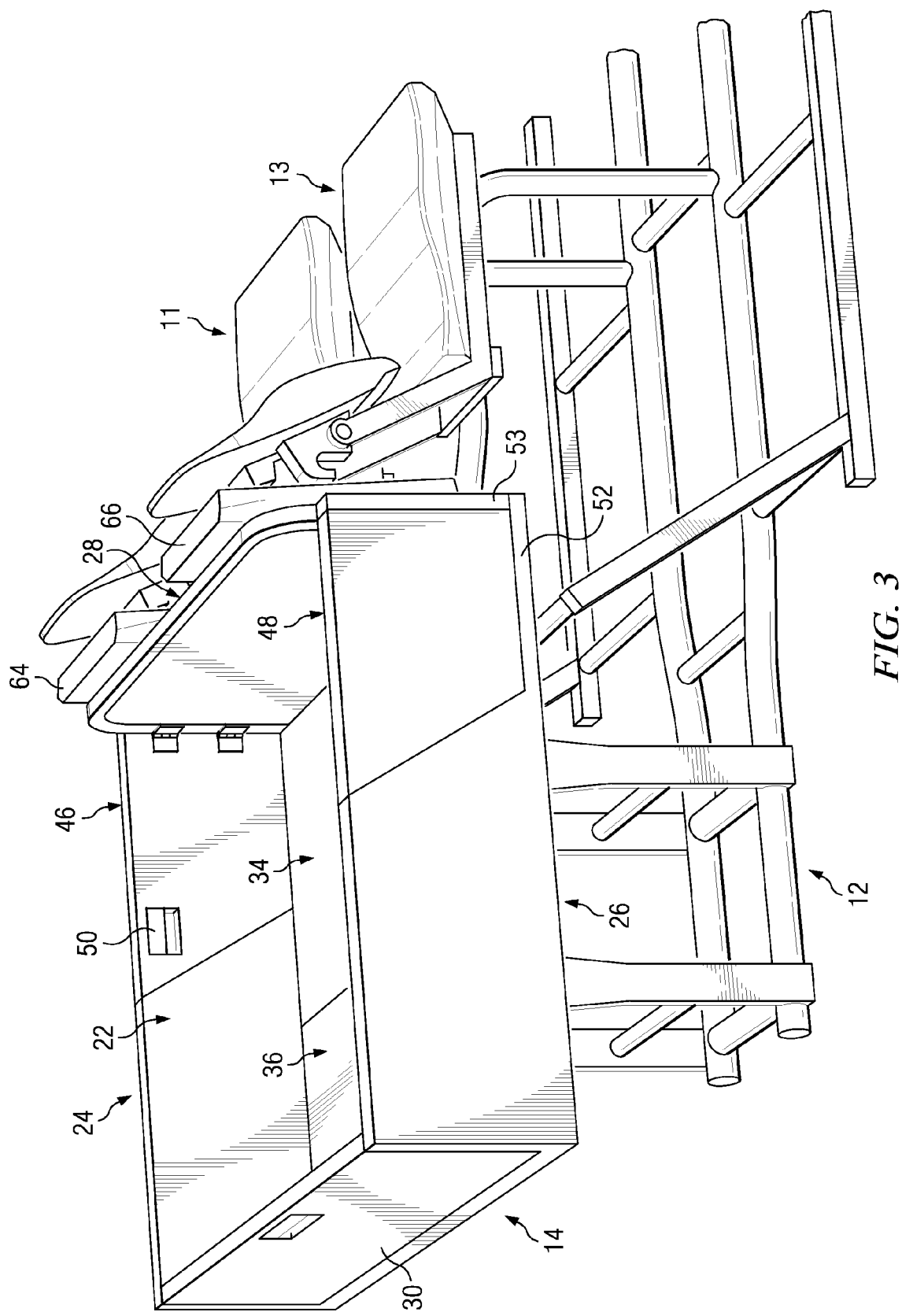
FIG. 3 is a right rear perspective view depicting the utility bed and other various components of the vehicle of FIG. 1, wherein the utility bed is shown in a hauling position with a front floor in a cargo support position, left and right doors in closed positions, and a front wall in an upright position.

The bed floor 22 is shown to comprise a front floor 34 and a rear floor 36. As illustrated in FIGS. 3 and 4, the front floor 34 can be pivotable with respect to the rear floor 36 between a cargo support position (FIG. 3) and an upright position (FIG. 4). The front floor 34 can define a front cargo support surface 38 and the rear floor 36 can define a rear cargo support surface 40. When the front floor 34 is in the cargo support position, the front cargo support surface 38 and the rear cargo support surface 40 can cooperate to define a substantially coplanar support surface that is configured to directly contact and provide underlying support for cargo (not shown) disposed within the utility bed 14. In an alternative embodiment, the bed floor 22 might not include a rear floor. It will be appreciated that first and second floor portions of a bed floor can be provided in any of a variety of suitable alternative arrangements.

The front floor 34 is shown to rest upon the bed frame 32 when the front floor 34 is in the cargo support position. The front floor is also shown to include a latch 35 that facilitates selective securement of the front floor 34 to the bed frame 32. Alternatively, the front floor 34 can be selectively retained to the bed frame 32 with any of a variety of other suitable releasable fasteners and/or mechanism(s). It will be appreciated that any of a variety of known conventional mechanisms or methods (none shown) can be provided to facilitate manual or powered movement of the front floor 34 between the cargo support position and the upright position. For example, the front floor 34 can include a selectively concealable handle (not shown). In another embodiment, an electronic linear actuator can be associated with the front floor 34 and the bed frame 32.

The front floor 34 is shown to be pivotally coupled to the rear floor 34 to facilitate pivoting of the front floor 34 between the cargo support position and the upright position. In other embodiments, it will be appreciated that a front floor can be pivotally coupled with a bed frame in any of a variety of suitable alternative arrangements. For example, a front floor can be pivotally attached directly to a bed frame. In one embodiment, the rear floor 34 can be rigidly secured to the bed frame 32. In another embodiment, the rear floor 34 can be pivotally attached to the bed frame 32 to facilitate selective access to the area underlying the utility bed 14 (e.g., facilitating access to the hinge assembly 16).

The left and right side walls 24, 26 are shown to include respective left and right doors 46, 48 which are each pivotable between a closed position (FIG. 3) and an opened position (FIG. 5). When in the closed position, each of the left and right doors 46, 48 can cooperate with the bed floor 22 and the front wall 28 to retain cargo within the utility bed 14. When the left and right doors 46, 48 are moved to the opened position, left and right openings 47, 49 can be defined.

The left and right doors 46, 48 are shown to be pivotally attached to the front wall 28 such that, when the left and right doors 46, 48 are in the opened position, they can each lie substantially parallel with and against the front wall 28. However, in alternative embodiments, left and right doors can be movably attached along the utility bed in any of a variety of suitable configurations. For example, left and right doors can be pivotally attached to adjacent portions of respective left and right side walls. When the left door is in the opened position, it can lie substantially parallel with and against the left side wall. When the right door is in the opened position, it can lie substantially parallel with and against the right side wall. In yet another example, left and right doors can be pivotally attached to a front floor. In such an embodiment, when the left and right doors are in the opened position, they can each lie substantially parallel with and against the front wall.

Figure 2:
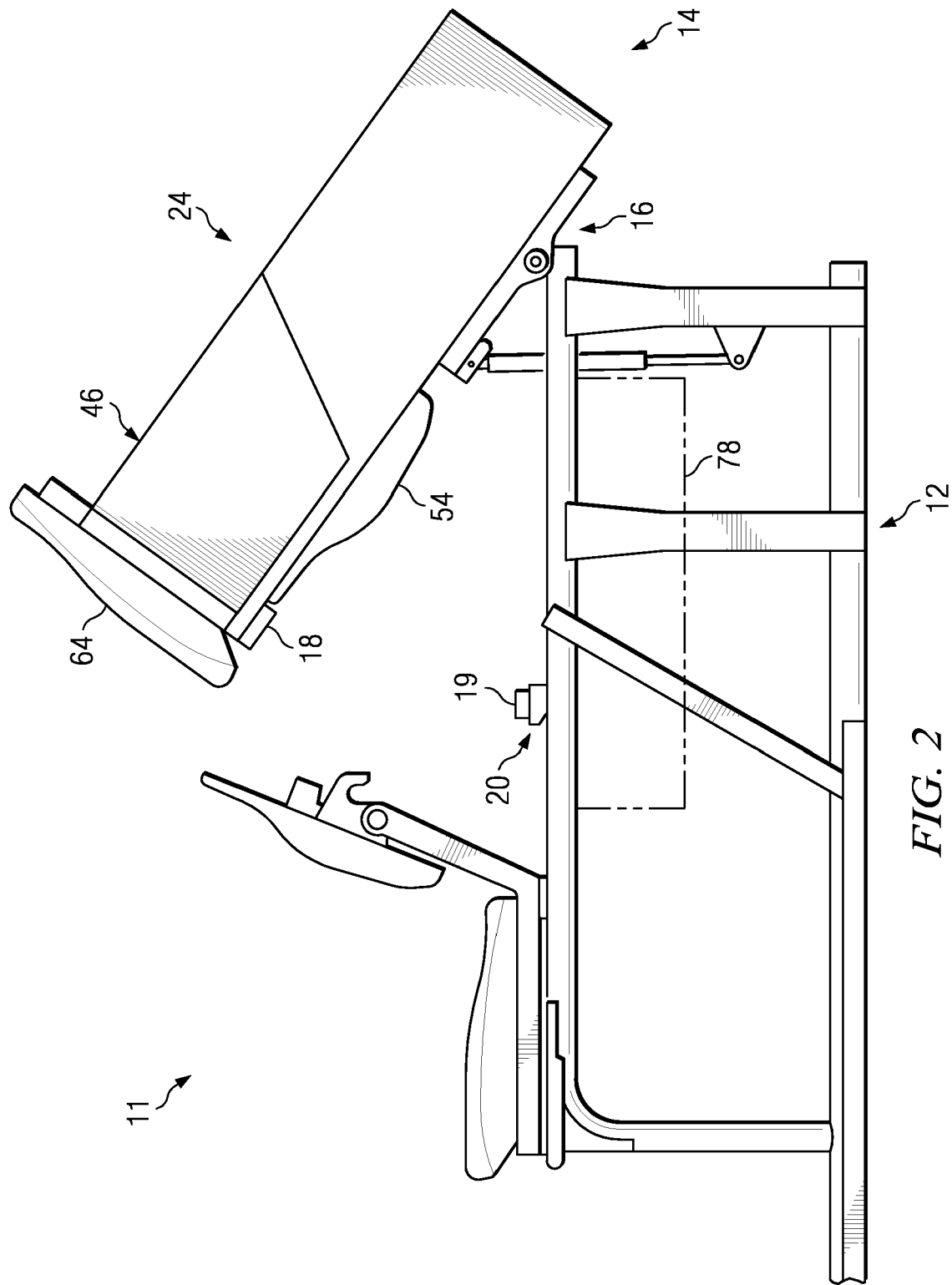
FIG. 2 is a side elevation view depicting a utility bed and other various components of the vehicle of FIG. 1, wherein the utility bed is shown in a dumping position.

The left and right side walls 24, 26 can be configured to ensure that the left and right doors 46, 48 can move to the opened position without being obstructed and while still maintaining proper aesthetics when the left and right doors 46, 48 are in their closed positions. As illustrated in FIGS. 2-5, the right side wall 26 can define a lower horizontally extending portion 52 and an end portion 53. When the right door is in the closed position, each of the portions 52, 53 can cooperate with the right door 48 to give the appearance of a substantially continuous right side wall 26. However, when the right door 48 is moved to the opened position, the horizontally extending portion 52 and the end portion 53 can remain in a fixed position thereby allowing the right door 48 to move to the opened position without being obstructed by the bed frame 32. As illustrated in FIG. 2, the left side wall 24 and left door 46 can be provided in a similar configuration.

In one embodiment, a seal can be provided along the perimeter of each of the left and right doors 46, 48. Each seal can facilitate selective sealing of the interaction between the door (e.g., 46, 48) and the adjacent side wall (e.g., 24, 26). In another embodiment, the left and right door 46, 48 can each include a manually operated latching mechanism (e.g., 50, 51) that facilitates selective securing of the left and right doors 46, 48 in their closed positions. In yet another embodiment, an attachment assembly (not shown) can be provided that selectively maintains the left and right doors 46, 48 in the opened position. For example, in the embodiment of FIGS. 1-6, an attachment assembly can be provided that selectively maintains the left and right doors 46, 48 against the front wall 28.

Figure 6:
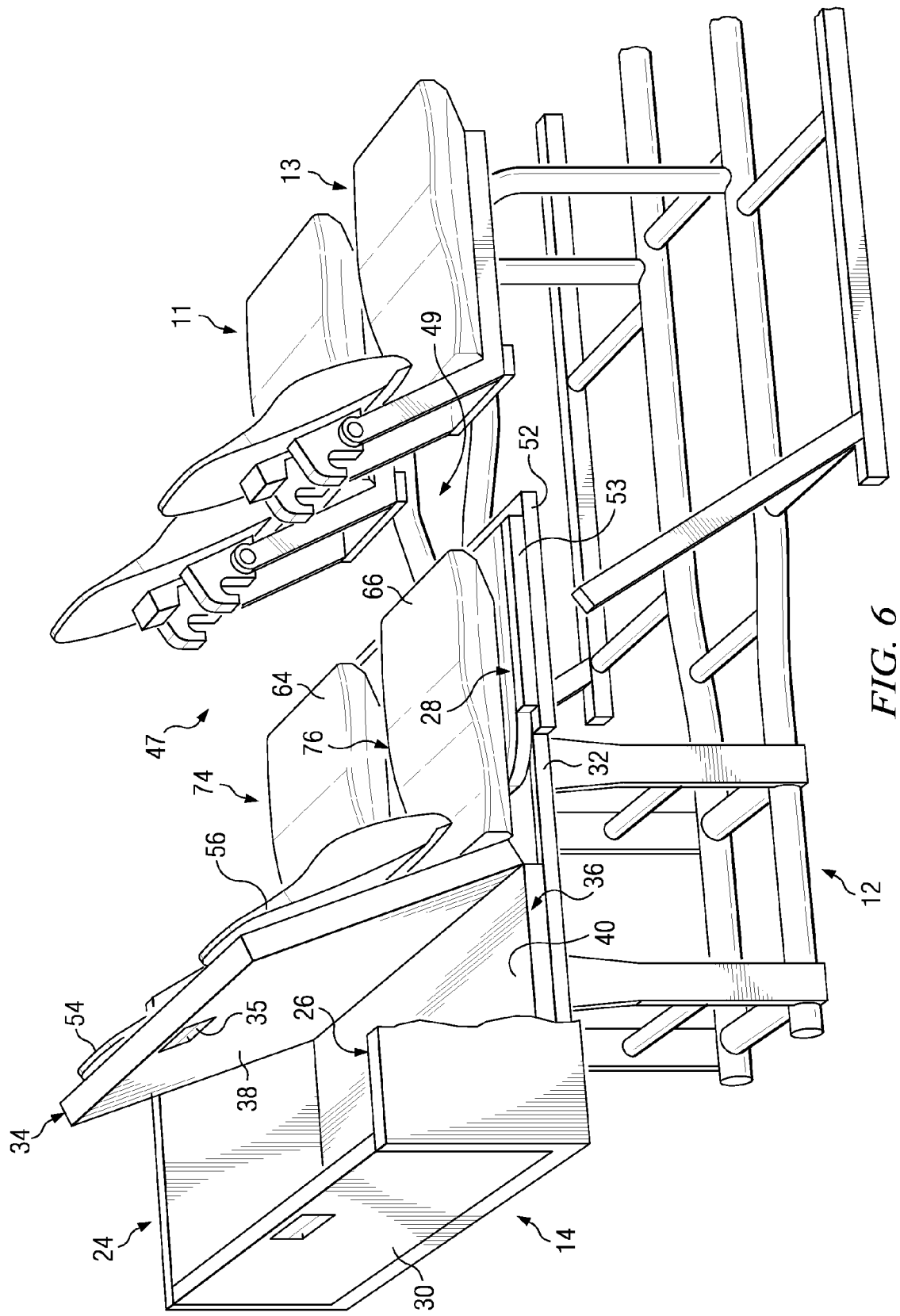
FIG. 6 is a right rear perspective view similar to FIG. 5 but with the front wall in a collapsed position.

As illustrated in FIGS. 5 and 6, the front wall 28 can be pivotable between an erected position (FIG. 5) and a collapsed position (FIG. 6). When the front wall 28 is in the erected position, the front wall 28 and the left and right side walls 24, 26 can cooperate with the bed floor 22 to retain cargo within the utility bed 14.

The front wall 28 is shown to be pivotally attached to the bed frame 32 to facilitate pivoting of the front wall 28 between the erected position and the collapsed position. It will be appreciated that a front wall can be pivotally coupled with a bed frame in any of a variety of suitable alternative arrangements. For example, a front wall can be pivotally attached to the vehicular frame 12 such that pivoting the utility bed 14 to the dumping position does not correspondingly pivot the front wall.

A left seat back 54 and a right seat back 56 are shown to be coupled (e.g., either directly or indirectly) with the front floor 32. A left seat bottom 64 and a right seat bottom 66 are shown to be coupled (e.g., either directly or indirectly) with the front wall 28. When the front floor 34 is in the cargo support position with the front wall 28 in the erected position, as shown in FIGS. 1-3, the left and right seat backs 54, 56 can be concealed beneath the utility bed 14 and the left and right seat bottoms 64, 66 can be stowed at a location that is behind the left and right front seats 11, 13. In such an arrangement, the front floor 32 and the rear floor 34 can cooperate to facilitate support of cargo by the utility bed 14. In one embodiment, as illustrated in FIG. 2, the utility bed 14 can include a cover member 78 provided beneath the utility bed 14 that is configured to selectively conceal the left and right seat backs 54, 56. In particular, when the front floor portion is in the cargo support position, the cover member 78 can protect the right and left seat backs 56, 66 from being contacted by debris during operation of the vehicle 10. The cover member 78 is shown in FIG. 2 to be secured to the vehicular frame 12. In another embodiment, the cover member 78 can be secured to the utility bed 14.

As illustrated, in FIGS. 4-6, the front floor 34, the left and right doors 46, 48, and the front wall 32 can each be moved to convert the utility bed 14 into rear seats for the vehicle 10. As illustrated in FIG. 4, the front floor 34 can be moved to the upright position to reveal the left seat back 54 and the right seat back 56. As illustrated in FIG. 5, with the front floor 34 in the upright position, each left and right door 46, 48 can be moved to their opened positions to define the respective left and right openings 47, 49. As illustrated in FIG. 6, once the left and right doors 46, 48 are moved to their opened positions, the front wall 28 can be pivoted to the collapsed position to move the left and right seat bottoms 64, 66 into a substantially horizontal position while concealing the left and right doors 46, 48 beneath the utility bed 14. In such an arrangement, the left and right seat backs 54, 56 can respectively cooperate with the left and right seat bottoms 64, 66 to define a left rear seat 74 and a right rear seat 76. Additionally, the left and right openings 47, 49 that are defined by opening the left and right doors 46, 48 can facilitate the ingress/egress of a passenger to/from the left and right rear seats 74, 76.

While the relative movement of the front floor 34, the left and right doors 46, 48, and the front wall 32 is shown in FIGS. 1-6, to be sequential, a utility bed can alternatively be provided that allows the front floor 34, the left and right doors 46, 48, and/or the front wall 32 to be moved independent of one another. In one embodiment, the front floor 34, the left and right doors 46, 48, and/or the front wall 32 can be moved manually. In another embodiment, the front floor 34, the left and right doors 46, 48, and/or the front wall 32 can be moved automatically, such as by actuating a pushbutton. In such an embodiment, each of the front floor 34, the left and right doors 46, 48, and the front wall 32 can be moved with motorized actuators.

It will be appreciated, that although the embodiment of FIGS. 1-6 illustrates forward facing rear seats 74, 76 which are disposed towards a front most portion of the utility bed 14, rear seats can be provided on a utility bed in any of a variety of suitable alternative arrangements. In one embodiment, a rear floor of the utility bed can include left and right seat backs and can be pivotable between a cargo support position and a upright position. A rear wall of the utility bed can include left and right seat bottoms and can be pivotable between an erected position and a collapsed position. When the rear wall is pivoted to the collapsed position with the rear floor in the upright position the left and right seat backs respectively cooperate with the left and right seat bottoms to define rearwardly facing left and right rear seats. In such an embodiment, the left and right side walls may or may not include respective left and right side doors since the rear seats can be accessed from the rear of the vehicle.

It will also be appreciated, that although the end walls (e.g., front and rear walls) have been described as being pivotable, end walls can be movable in any of a variety of suitable alternative manners to selectively reveal a seat bottom. In one embodiment, a front wall can be removable from the utility bed to facilitate manual positioning of the front wall in the erected or collapsed position. It will also be appreciated that the floor portions, such as front and rear portions can also be otherwise movable.

Although the embodiments above have been described with respect to individual left and right rear seats, it will be appreciated that in other embodiments the utility bed can include more than two seats or less than two seats. In yet another embodiment, the utility bed can provide split rear seats. In such an embodiment, a front wall can be bifurcated into left and right portions. Each left and right portion can support a seat bottom. A front floor of the utility bed can be similarly bifurcated into left and right portions. Each left and right portion can support a seat back. In such an arrangement, left and right rear seats can be individually selectively erected from the utility bed.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. A vehicle comprising:
a vehicular frame;
a utility bed pivotally coupled with the vehicular frame and pivotable between a hauling position and a dumping position, the utility bed comprising:
a bed frame;
a front floor that is pivotable with respect to the bed frame between an upright position and a cargo support position;
a front wall movably coupled with the bed frame and moveable between an erected position and a collapsed position;
a left side wall comprising a left door that is pivotable between an opened position and a closed position; and
a right side wall comprising a right door that is pivotable between an opened position and a closed position;
a seat back coupled with the front floor; and
a seat bottom coupled with the front wall;
wherein the left door and the right door are each pivotally coupled with the front wall.

2. The vehicle of claim 1 wherein the front floor is pivotally coupled with the bed frame.

3. The vehicle of claim 1 wherein the front wall is pivotally coupled with the bed frame and is pivotable between the erected position and the collapsed position.

4. The vehicle of claim 1 wherein the seat back and the seat bottom cooperate to provide a forward-facing rear seat.

5. The vehicle of claim 1 further comprising a cover member coupled with the vehicular frame and configured to substantially cover the seat back when the front floor is in the cargo support position.

6. The vehicle of claim 1 wherein the utility bed further comprises a rear floor coupled with the bed frame.

7. The vehicle of claim 6 wherein the front floor is pivotally coupled with the rear floor.

8. A vehicle comprising:
a vehicular frame;
a utility bed coupled with the vehicular frame and comprising:
a bed frame;
a bed floor comprising a first floor portion, the first floor portion being pivotable between an upright position and a cargo support position;
an end wall movably coupled with the bed frame and moveable between an erected position and a collapsed position;
a left side wall comprising a left door that is pivotable between an opened position and a closed position; and
a right side wall comprising a right door that is pivotable between an opened position and a closed position;
a seat back coupled with the first floor portion; and
a seat bottom coupled with the end wall;
wherein the left door and the right door are each pivotally coupled with the end wall and wherein, when the first floor portion is in the upright position with the end wall in the collapsed position, the seat back and seat bottom cooperate to provide a seat.

9. The vehicle of claim 8 wherein the first floor portion is pivotally coupled with the bed frame.

10. The vehicle of claim 9 wherein the utility bed is pivotally coupled with the vehicular frame and is pivotable between a hauling position and a dumping position.

11. The vehicle of claim 8 wherein the end wall is pivotally coupled with the bed frame and is pivotable between the erected position and the collapsed position.

12. The vehicle of claim 8 wherein the left door is substantially parallel with the end wall when the left door is in the opened position and the right door is substantially parallel with the end wall when the right door is in the opened position.

13. The vehicle of claim 8 wherein the seat back and the seat bottom cooperate to provide a forward-facing rear seat.

14. The vehicle of claim 8 wherein the utility bed further includes a second floor portion coupled with the bed frame and, when the first floor portion is in the cargo support position, the first floor portion and the second floor portion are substantially coplanar.

15. The vehicle of claim 8 wherein the utility bed further includes a second floor portion coupled with the bed frame and the first floor portion is pivotally attached to the second floor portion.

16. A vehicle comprising:
a vehicular frame;
a utility bed pivotally coupled with the vehicular frame and pivotable between a hauling position and a dumping position, the utility bed comprising:
a bed frame;
a bed floor comprising:
a rear floor coupled with the bed frame; and
a front floor pivotally coupled with the rear floor and being pivotable between an upright position and a cargo support position;
a front wall pivotally coupled with the bed frame and pivotable between an erected position and a collapsed position;
a left side wall comprising a left door that is pivotally coupled with the front wall and pivotable between an opened position and a closed position; and
a right side wall comprising a right door that is pivotally coupled with the front wall and pivotable between an opened position and a closed position;
a left seat back coupled with the front floor;
a right seat back coupled with the front floor;
a left seat bottom coupled with the front wall; and
a right seat bottom coupled with the front wall;
wherein the left door and the right door are each pivotally coupled with the front wall and wherein, when the front floor is in the upright position with the front wall in the collapsed position, the left seat back and the left seat bottom cooperate to provide a left seat, and the right seat back and the right seat bottom cooperate to provide a right seat.

* * * * *